(12) United States Patent
Galuska et al.

(10) Patent No.: US 11,319,417 B2
(45) Date of Patent: May 3, 2022

(54) METHODS OF MANUFACTURING HIGHLY CROSSLINKED POLYMER PARTICULATE

(71) Applicant: ExxonMobil Upstream Research Company, Spring, TX (US)

(72) Inventors: Alan A. Galuska, Huffman, TX (US); Pavlin B. Entchev, Spring, TX (US); William Handy, Spring, TX (US); Robert M. Shirley, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 53 days.

(21) Appl. No.: 16/938,393

(22) Filed: Jul. 24, 2020

(65) Prior Publication Data

US 2021/0047482 A1    Feb. 18, 2021

Related U.S. Application Data

(60) Provisional application No. 62/943,978, filed on Dec. 5, 2019, provisional application No. 62/944,106, filed on Dec. 5, 2019, provisional application No. 62/888,214, filed on Aug. 16, 2019, provisional application No. 62/888,221, filed on Aug. 16, 2019.

(51) Int. Cl.
*C08J 3/24* (2006.01)
*C08K 5/14* (2006.01)

(52) U.S. Cl.
CPC .............. *C08J 3/24* (2013.01); *C08K 5/14* (2013.01); *C08J 2323/06* (2013.01)

(58) Field of Classification Search
CPC . C08J 3/24; C08J 3/28; C08F 2500/18; C08F 2810/20; C08F 10/02; C08F 110/02; C08F 210/02
See application file for complete search history.

(56) References Cited

U.S. PATENT DOCUMENTS

| | | | | |
|---|---|---|---|---|
| 4,188,470 A | * | 2/1980 | Collina | C08F 110/02 526/64 |
| 4,525,486 A | * | 6/1985 | Kobayashi | C08J 9/18 521/139 |
| 6,573,314 B1 | * | 6/2003 | Knudsen | B29B 9/12 523/223 |
| 2012/0325474 A1 | | 12/2012 | Bicerano | |

(Continued)

FOREIGN PATENT DOCUMENTS

| | | |
|---|---|---|
| GB | 2359316 A | 8/2001 |
| JP | 05-301971 | * 11/1993 |

OTHER PUBLICATIONS

Illgen, Journal of Arthroplasty, vol. 24, No. 1, 2009, p. 117-124 (Year: 2009).*

(Continued)

*Primary Examiner* — Robert C Boyle
(74) *Attorney, Agent, or Firm* — Leandro Arechederra, III

(57) ABSTRACT

Methods of manufacturing highly crosslinked polymer particulate. The methods include positioning a granular polymeric material within a crosslinking apparatus and crosslinking the granular polymeric material with the crosslinking apparatus to form a highly crosslinked polymeric material. The methods also include forming a plurality of crosslinked polymer granules from the highly crosslinked polymeric material.

20 Claims, 3 Drawing Sheets

(56) References Cited

U.S. PATENT DOCUMENTS

| | | |
|---|---|---|
| 2013/0245773 A1 | 9/2013 | Muratoglu |
| 2014/0113133 A1* | 4/2014 | Sun ........................ H01B 3/441 |
| | | 428/375 |
| 2018/0044574 A1 | 2/2018 | Lopez |
| 2019/0030768 A1* | 1/2019 | Hayase ...................... C08J 9/18 |

OTHER PUBLICATIONS

Translation of JP 05-301971 (Year: 1993).*
Atkinson et al; "Silane cross-linked polyethylene for prosthetic applications Part I. Certain physical and mechanical properties related to the nature of the material", Biomaterials, 1983, vol. 4, No. 4, pp. 267-275.
Chodak et al; "Properties of crosslinked polyolefin-based materials", Progress in Polymer Science, 1995, vol. 20, No. 6, pp. 1166-1179.
Gheysari, DJ, The effect of high-energy electron beam on mechanical and thermal properties of LDPE and HDPE, European Polymer Journal, 2001, pp. 295-302, vol. 37.

* cited by examiner

METHODS OF MANUFACTURING HIGHLY CROSSLINKED POLYMER PARTICULATE

CROSS-REFERENCE TO RELATED APPLICATION

This application also claims the benefit of U.S. Provisional Application 62/888,214 filed Aug. 16, 2019 entitled "Crosslinked Granular Polyethylene and U.S. Provisional Application 62/944,106 filed Dec. 5, 2019 entitled "Highly Crosslinked Polymer Particulate," the entireties of which are incorporated by reference herein. This application also claims the benefit of U.S. Provisional Application 62/943,978 filed Dec. 5, 2019 entitled "Method of Manufacturing Crosslinked Polymer Particulate" and U.S. Provisional Application 62/888,221 filed Aug. 16, 2019 entitled "Method of Manufacturing Crosslinked Granular Polyethylene," the entireties of which are incorporated by reference herein. This application is also related to U.S. Provisional Application 62/890,185 filed Aug. 22, 2019 entitled" Granular Crosslinked Polyethylene as a Hydraulic Fracturing Proppant", the entirety of which is incorporated by reference herein. This application is also related to U.S. Provisional Application 62/890,186 filed Aug. 22, 2019 entitled "Granular Crosslinked Polyethylene as a Loss Circulation Material in a Wellbore Operation Fluid", the entirety of which is incorporated by reference herein. This application is also related to U.S. Provisional Application 62/890,188 filed Aug. 22, 2019 entitled "Granular Crosslinked Polyethylene as a Density Modifier in a Wellbore Operation Fluid Mixture", the entirety of which is incorporated by reference herein. This application is also related to U.S. Provisional Application 62/904,993 filed Sep. 24, 2019 entitled "Granular Crosslinked Polyethylene as a Density Modifier in a Wellbore Operation Fluid Mixture", the entirety of which is incorporated by reference herein.

FIELD OF THE DISCLOSURE

The present disclosure relates generally to methods of manufacturing highly crosslinked polymer particulate, and more specifically to methods of manufacturing highly crosslinked polymer particulate that includes polyethylene.

BACKGROUND OF THE DISCLOSURE

Polyethylene exhibits chemical and/or material properties that cause it to be widely utilized in industry. While suitable for many applications, polyethylene may be relatively soft, may be flexible, and/or may flow when subject to stress, especially at elevated temperatures. In addition, two polyethylene bodies, when brought into contact with one another under conditions of high stress and/or high temperature, may agglomerate. This softness, flow, and/or agglomeration of conventional polyethylene may be undesirable for certain applications, where materials with a greater hardness, a lower propensity for flow, and/or a decreased potential for agglomeration may be desirable. Thus, there exists a need for methods of manufacturing highly crosslinked polymer particulate.

SUMMARY OF THE DISCLOSURE

Methods of manufacturing highly crosslinked polymer particulate. The methods include positioning a granular polymeric material within a crosslinking apparatus. The granular polymeric material may include a plurality of polyethylene polymer chains. The methods also include crosslinking the granular polymeric material with the crosslinking apparatus to form a highly crosslinked polymeric material. The highly crosslinked polymeric material may include a plurality of chemical crosslinks. The plurality of chemical crosslinks may include chemical crosslinks that covalently bond a given polyethylene polymer chain of the plurality of polyethylene polymer chains to another polyethylene polymer chain of the plurality of polyethylene polymer chains. The methods also include forming a plurality of crosslinked polymer granules from the highly crosslinked polymeric material. A characteristic dimension of each crosslinked polymer granule of the plurality of crosslinked polymer granules may be at least 10 micrometers and at most 5 millimeters.

DETAILED DESCRIPTION AND BEST MODE OF THE DISCLOSURE

Figure 1:
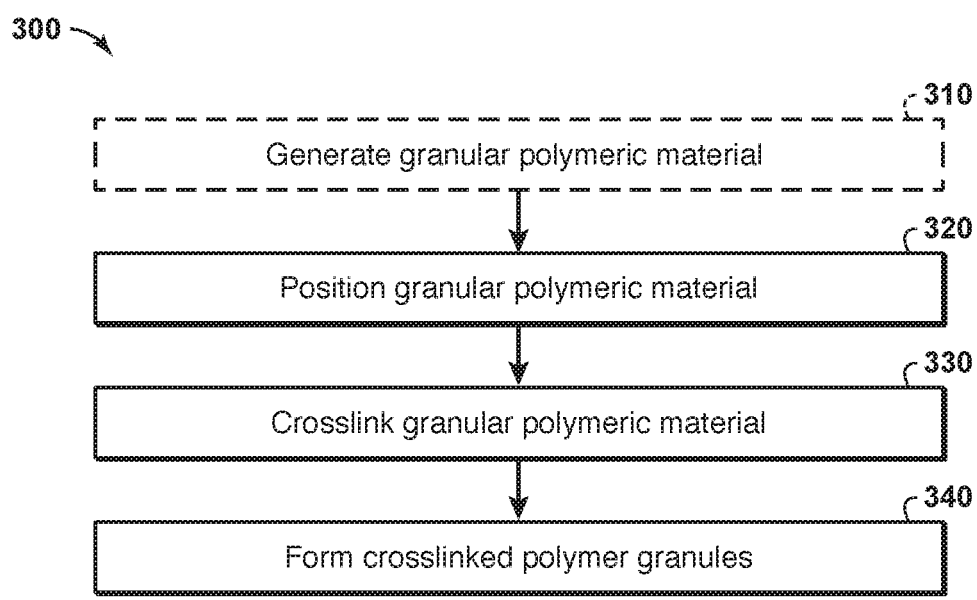
FIG. 1 is a flowchart depicting examples of methods of manufacturing highly crosslinked polymer particulate, according to the present disclosure.
Figure 2:
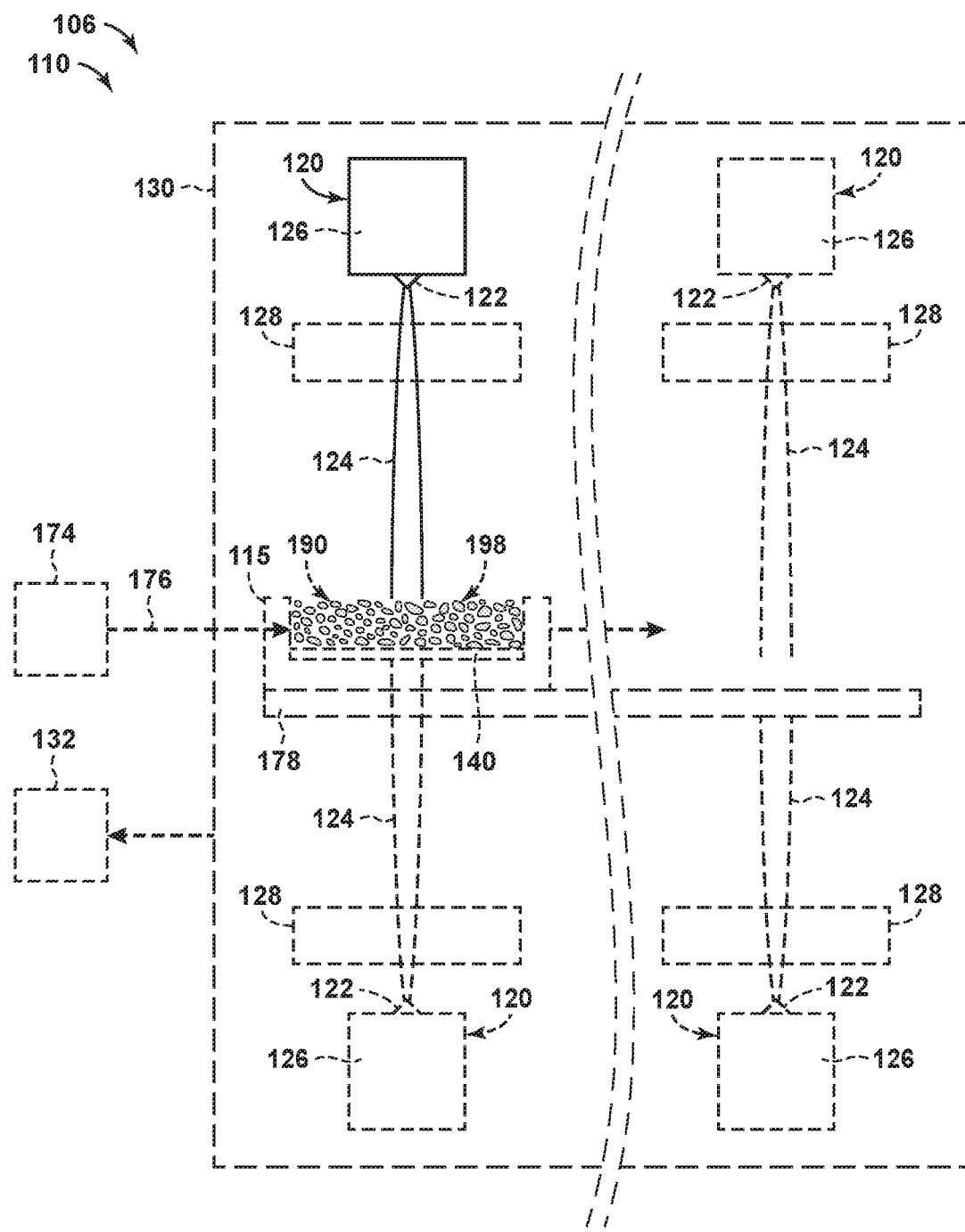
FIG. 2 is a schematic illustration of examples of a crosslinking apparatus in the form of an electron beam irradiation system that may be utilized during manufacture of highly crosslinked polymer particulate, according to the present disclosure.
Figure 3:
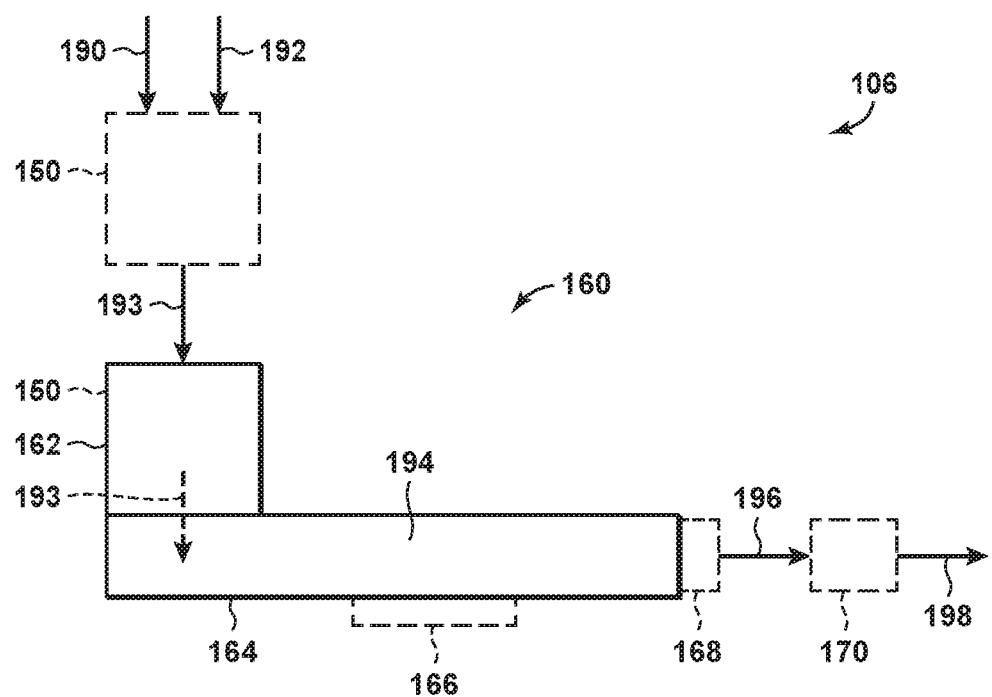
FIG. 3 is a schematic illustration of examples of a crosslinking apparatus in the form of an extrusion apparatus that may be utilized during manufacture of highly crosslinked polymer particulate, according to the present disclosure.

FIGS. 1-3 provide examples of methods 300 of manufacturing highly crosslinked polymer particulate and/or of crosslinking apparatus 106 that may be utilized during manufacture of the highly crosslinked polymer particulate, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure.

In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Highly crosslinked polymer particulate, according to the present disclosure, includes a plurality of crosslinked polymer granules. The plurality of crosslinked polymer granules each contains, or each crosslinked polymer granule of the plurality of crosslinked polymer granules contains, a polymeric material, which also may be referred to herein as a crosslinked polymeric material and/or as a highly crosslinked polymeric material. The highly crosslinked polymeric material includes a plurality of polyethylene polymer chains and a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

In some examples, the plurality of polyethylene polymer chains may include a plurality of linear polyethylene polymer chains. In some examples, each polyethylene polymer chain of the plurality of polyethylene polymer chains includes a plurality of methylene repeat units and/or a plurality of ethylene repeat units covalently bonded to one another to form a plurality of carbon-carbon bonds.

In some examples, at least a subset of the plurality of polyethylene polymer chains includes a branched polymer chain. The branched polymer chain may include at least one branch group, which may extend from a polymer backbone of the branched polymer chain. In some such examples, a given chemical crosslink of the plurality of chemical crosslinks may extend from the at least one branch group.

The at least one branch group, when present, may include any suitable number of carbon atoms and/or may have any suitable length. As examples, the at least one branch group may include at least 10, at least 25, at least 50, at least 100, at least 500, at least 1,000, at least 5,000, at least 10,000, at least 25,000, and/or at least 50,000 carbon atoms. The carbon atoms that form the at least one branch group may be arranged linearly, such as along a branch group backbone of the at least one branch group. Alternatively, the carbon atoms that form the at least one branch group may, themselves, form sub-branches. Stated another way, the at least one branch group may, itself, be branched.

In some examples, at least a subset of the plurality of polyethylene polymer chains includes a pendant group that extends from the polymer backbone of the subset of the plurality of polyethylene polymer chains. In some such examples, a given chemical crosslink of the plurality of chemical crosslinks may extend from the pendant group. The pendant group, when present, may include any suitable number of carbon atoms. As examples, the pendant group may include at least 1, at least 2, at least 3, at least 4, at least 5, at least 6, at least 7, at least 8, at least 10, at least 15, at least 20, at most 50, at most 40, at most 30, at most 20, at most 15, at most 12, at most 10, at most 8, and/or at most 6 carbon atoms.

The pendant group may have and/or define any suitable structure, including linear structures, branched structures, cyclic structures, and/or combinations thereof. A specific example of the pendant group includes pendant groups that may decrease, or limit, a degree of crosslinking of the plurality of crosslinked polymer granules, such as via increasing a minimum distance between adjacent polyethylene polymer chains and/or by making it difficult for the polymer backbones of adjacent polyethylene polymer chains to closely pack. Examples of such pendant groups include a methyl group, an ethyl group, a propyl group, a butyl group, a pentyl group, a hexyl group, a heptyl group, an octyl group, a nonyl group, and/or a decyl group.

In some examples, and prior to formation of the plurality of chemical crosslinks, the pendant group may include a ring, a cyclic structure, and/or a double bond, which may permit and/or facilitate formation of a corresponding chemical crosslink. Examples of such pendant groups include a cyclic hydrocarbon, a bridged cyclic hydrocarbon, a norbornene-derived pendant group, an ethylidene-derived pendant group, and/or a vinyl norbornene-derived pendant group.

The plurality of polyethylene polymer chains may be highly crosslinked via the plurality of chemical crosslinks. The plurality of polyethylene polymer chains may have and/or define any suitable degree of crosslinking, or average degree of crosslinking. Examples of the average degree of crosslinking include at least 0.01%, at least 0.1%, at least 1%, at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, and/or at least 50%. In some examples, the highly crosslinked polymeric material within a given crosslinked polymer granule may be so highly crosslinked that the given crosslinked polymer granule may be defined by, at least substantially entirely by, or even entirely by a single polymeric molecule.

As used herein, the phrase "degree of crosslinking" may refer to a mole percentage, or an average mole percentage, of repeat units within a given polyethylene polymer chain that are crosslinked to another polyethylene polymer chain. For example, a polyethylene polymer chain with 100 repeat units and one crosslink would exhibit a "degree of crosslinking" of $1/100 = 1\%$. Similarly, a polyethylene polymer chain with 100 repeat units and 10 crosslinks would exhibit a "degree of crosslinking" of $10/100 = 10\%$.

Each chemical crosslink may extend from any suitable portion of a given polyethylene polymer chain to any suitable portion of another polyethylene polymer chain. For example, a chemical crosslink may extend from an ethylene repeat unit of a given polyethylene polymer chain to an ethylene repeat unit of another polyethylene polymer chain to form a covalent bond therebetween. As another example, for examples in which at least a subset of the plurality of polyethylene polymer chains includes a pendant group, a chemical crosslink may extend from a portion of a pendant group included in a given polyethylene polymer chain to a pendant group of another polyethylene polymer chain. Alternatively, the chemical crosslink may extend from a polymer backbone of a given polyethylene polymer chain to a pendant group of another polyethylene polymer chain.

In some examples, the plurality of chemical crosslinks may be distributed, evenly distributed, or even homogeneously distributed throughout the plurality of crosslinked polymer granules. Stated another way, and in these examples, the plurality of chemical crosslinks may be distributed throughout the plurality of crosslinked polymer granules.

In some examples, the plurality of chemical crosslinks may be heterogeneously distributed within each crosslinked polymer granule, such as when the plurality of chemical crosslinks is preferentially distributed proximate an external surface of each crosslinked polymer granule. Stated another way, each crosslinked polymer granule may include an external shell that exhibits a higher degree of crosslinking relative to a remainder of the crosslinked polymer granule.

The plurality of crosslinked polymer granules may have and/or define any suitable structure. As examples, the plurality of crosslinked polymer granules may include and/or be a plurality of high density polyethylene granules and/or a plurality of crosslinked high density polyethylene granules.

In addition, the plurality of crosslinked polymer granules may have and/or define any suitable shape. As examples, the plurality of crosslinked polymer granules may include a plurality of irregularly shaped crosslinked polymer granules, a plurality of spheroid-shaped crosslinked polymer granules, a plurality of at least partially spherical crosslinked polymer granules, a plurality of spherical crosslinked polymer granules, a plurality of at least partially cylindrical crosslinked polymer granules, a plurality of cylindrical crosslinked polymer granules, and/or a plurality of rod-shaped crosslinked polymer granules. In some examples, the plurality of crosslinked polymer granules may include polyethylene particles produced by a polyethylene reactor and subsequently crosslinked to form the plurality of crosslinked polymer granules.

The plurality of crosslinked polymer granules may include recycled polyethylene. As an example, the highly crosslinked polymer particulate, or the plurality of crosslinked polymer granules that comprise the highly crosslinked polymer particulate, may include at least a threshold fraction of a post-consumer granular polymeric material. Examples of the threshold fraction of the post-consumer granular polymeric material include 5 weight percent, 10 weight percent, 15 weight percent, 20 weight percent, 25 weight percent, 30 weight percent, 40 weight percent, 50 weight percent, 60 weight percent, 70 weight percent, 80 weight percent, 90 weight percent, 95 weight percent, 99 weight percent, and/or 100 weight percent.

A characteristic dimension of each crosslinked polymer granule is within a threshold characteristic dimension range of at least 10 micrometers and at most 5 millimeters. As more specific examples, a lower limit of the characteristic dimension range may be at least 10 micrometers, at least 15 micrometers, at least 20 micrometers, at least 25 micrometers, at least 30 micrometers, at least 40 micrometers, at least 50 micrometers, at least 75 micrometers, at least 100 micrometers, at least 125 micrometers, at least 150 micrometers, at least 200 micrometers, at least 250 micrometers, at least 300 micrometers, at least 400 micrometers, at least 500 micrometers, at least 600 micrometers, at least 700 micrometers, at least 800 micrometers, at least 900 micrometers, and/or at least 1,000 micrometers. Additionally or alternatively, an upper limit of the characteristic dimension range may be at most 5 millimeters, at most 3.5 millimeters, at most 3 millimeters, at most 2.5 millimeters, at most 2 millimeters, at most 1.5 millimeters, at most 1.25 millimeters, at most 1 millimeter, at most 900 micrometers, at most 800 micrometers, at most 700 micrometers, at most 600 micrometers, at most 500 micrometers, at most 400 micrometers, and/or at most 300 micrometers.

Examples of the characteristic dimension include a maximum extent of each crosslinked polymer granule and/or a diameter of each crosslinked polymer granule. Additional examples of the characteristic dimension include an effective diameter of each crosslinked polymer granule and/or a minimum diameter of a sphere that fully contains each crosslinked polymer granule.

FIG. 1 is a flowchart depicting examples of methods 300 of manufacturing highly crosslinked polymer particulate, according to the present disclosure. Methods 300 may include generating a granular polymeric material at 310 and include positioning the granular polymeric material at 320. Methods 300 also include crosslinking the granular polymeric material at 330 and forming crosslinked polymer granules at 340.

In general, methods 300 describe mechanisms via which the granular polymeric material may be converted to, or utilized to form, crosslinked polymer granules that form and/or define the highly crosslinked polymer particulate. Examples of the highly crosslinked polymer particulate that may be manufactured utilizing methods 300 are disclosed herein. Examples of properties of the highly crosslinked polymer particulate also are disclosed herein.

The granular polymeric material that is utilized to form and/or define the highly crosslinked polymer particulate may include any suitable granular material that includes polyethylene, that includes a plurality of polyethylene polymer chains, and/or that is not, or that does not include, the crosslinked polymer granules. In some examples, the granular polymeric material may include and/or be a post-consumer granular polymeric material and/or a recycle stream of the granular polymeric material. In these examples, the granular polymeric material may include at least a threshold fraction of the post-consumer granular polymeric material. Examples of the threshold fraction of the post-consumer granular polymeric material are disclosed herein.

In some examples, and in addition to polyethylene, the granular polymeric material may include one or more additional materials. Examples of the one or more additional materials include another polymer, a colorant, a filler, an adhesive, a metal, glass, alumina, and/or a silicate. In some such examples, the one or more additional materials purposefully may be added to and/or combined with the polyethylene to generate the granular polymeric material. In some such examples, such as when the granular polymeric material includes the post-consumer granular polymeric material, the one or more additional materials already may be incorporated with the polyethylene in the granular polymeric material.

Generating the granular polymeric material at 310 may include generating the granular polymeric material in any suitable manner. As an example, the generating at 310 may include severing a bulk polymeric material to produce and/or generate the granular polymeric material. Examples of the severing include cutting, grinding, chopping, splitting, breaking, slicing, and/or otherwise decreasing a size, or a maximum dimension, of the bulk polymeric material to produce and/or generate the granular polymeric material. Examples of the bulk polymeric material include a post-consumer bulk polymeric material, a polymeric film, a polymeric sheet, a polymeric block, an uncrosslinked polymeric granule, and/or a polymeric fiber. Examples of the polymeric fiber include polymeric cylinders, polymeric rods, polymeric filaments, and/or polymeric strings.

As another example, the granular polymeric material may include polyethylene pellets, which may be generated within and/or by a polyethylene reactor. In these examples, the generating at 310 may include generating the polyethylene pellets within the polyethylene reactor. Also in these examples, the generating at 310 may include selecting at least one property of a catalyst, which is utilized within the polyethylene reactor, such that a characteristic dimension of the granular polymeric material is within a threshold characteristic dimension range. Examples of the threshold characteristic dimension range are disclosed herein with respect to the threshold characteristic dimension range of the crosslinked polymer granules. Stated another way, and in some examples, a characteristic dimension of the crosslinked polymer granules may be at least partially defined by, or even may be equal to, the characteristic dimension of the granular polymeric material.

Positioning the granular polymeric material at 320 may include positioning the granular polymeric material within a crosslinking apparatus. This may include positioning within a hopper and/or within a granule holder of the crosslinking apparatus and/or may include positioning to permit and/or to facilitate the crosslinking at 330. As discussed, the granular polymeric material includes polyethylene and/or includes a plurality of polyethylene polymer chains. Examples of the crosslinking apparatus are disclosed herein.

Crosslinking the granular polymeric material at 330 may include crosslinking the granular polymeric material with, within, and/or utilizing the crosslinking apparatus. This may include crosslinking to form a highly crosslinked polymeric material that includes a plurality of chemical crosslinks. As discussed herein, the plurality of chemical crosslinks may include chemical crosslinks that covalently bond a given polyethylene polymer chain to another polyethylene polymer chain.

In some examples, the crosslinking at 330 may include directly crosslinking the granular polymeric material. Stated another way, methods 300 may include maintaining a morphology, or a shape, of the granular polymeric material during the crosslinking at 330 and/or maintaining the morphology of the granular polymeric material in and/or within the highly crosslinked polymeric material and/or in and/or within the plurality of crosslinked polymer granules. Stated yet another way, a morphology of the granular polymeric material may be similar to, at least substantially identical to, or even identical to the morphology of the granular polymeric material.

In some examples, the crosslinking at 330 may include changing the morphology of the granular polymeric material to produce and/or generate the highly crosslinked polymeric material and/or the plurality of crosslinked polymer granules. As an example, the crosslinking at 330 may include combining a plurality of polymeric granules of the granular polymeric material to produce, to generate, and/or to form the highly crosslinked polymeric material.

Forming crosslinked polymer granules at 340 may include forming a plurality of crosslinked polymer granules from and/or with the highly crosslinked polymeric material. A characteristic dimension of each crosslinked polymer granule of the plurality of crosslinked polymer granules may be within a threshold characteristic dimension range, examples of which are disclosed herein.

In some examples, such as when the crosslinking at 330 includes maintaining the morphology of the granular polymeric material, the characteristic dimension of each crosslinked polymer granule may be defined, specified, and/or regulated by the characteristic dimension of the granular polymeric material. In some such examples, the forming at 340 may be, or may be referred to herein as being, at least partially concurrent with the crosslinking at 330 and/or responsive to the crosslinking at 330.

In some examples, such as when the crosslinking at 330 includes changing the morphology of the granular polymeric material to form the highly crosslinked polymeric material, the characteristic dimension of the each crosslinked polymer granule may differ from a characteristic dimension of the highly crosslinked polymeric material. In some such examples, forming at 340 may be, or may be referred to herein as being, at least partially concurrent with the crosslinking at 330 and/or responsive to the crosslinking at 330. In some such examples, the forming at 340 may be, or may be referred to herein as being, subsequent to the crosslinking at 330. In some such examples, the forming at 340 further may include severing the highly crosslinked polymeric material to form, define, and/or produce the plurality of crosslinked polymer granules.

As discussed, the positioning at 320 may include positioning the granular polymeric material in and/or within the crosslinking apparatus and/or the crosslinking at 330 may include crosslinking the granular polymeric material in and/or within the crosslinking apparatus. An example of the crosslinking apparatus includes an electron beam irradiation system. FIG. 2 is a schematic illustration of examples of a crosslinking apparatus 106, in the form of an electron beam irradiation system 110, that may be utilized during manufacture of highly crosslinked polymer particulate, according to the present disclosure.

In some examples, the crosslinking at 330 may include irradiating the granular polymeric material with an electron beam to produce and/or facilitate formation of the plurality of crosslinked polymer granules. As an example, and when the crosslinking apparatus includes electron beam irradiation system 110 of FIG. 2, the crosslinking at 330 may include irradiating the granular polymeric material with an electron beam 124. In the example of FIG. 2, electron beam 124 is irradiating granular polymeric material 190 to form and/or define crosslinked polymer granules 198. Also in the example of FIG. 2, granular polymeric material 190 and/or crosslinked polymer granules 198 are contained within a granule holder 115.

The crosslinking apparatus may include an electron beam source, such as electron beam source 120 of FIG. 2. The electron beam source may be configured to generate the electron beam, and the irradiating may include irradiating with the electron beam and/or with, via, and/or utilizing the electron beam source.

The electron beam source may include a filament, such as filament 122 of FIG. 2. The filament may be configured to emit the electron beam. Under these conditions, the irradiating further may include applying an acceleration voltage to the filament to produce and/or to generate the electron beam. The acceleration voltage may be supplied by a power supply, such as power supply 126 of FIG. 2. Examples of the power supply include a high voltage power supply, a variable voltage power supply, an alternating current power supply, and/or a direct current power supply.

The acceleration voltage may be selected to produce and/or to generate at least one desired mechanical property in the crosslinked polymer granules. Examples of the at least one desired mechanical property are disclosed herein. Additionally or alternatively, the acceleration voltage may be selected such that the electron beam penetrates, or fully penetrates, the granular polymeric material. Examples of the acceleration voltage include acceleration voltages of at least 200 kilo-electron volts (keV), at least 400 keV, at least 600 keV, at least 800 keV, at least 1 mega-electron volt (MeV) at least 2 MeV, at least 4 MeV, at least 6 MeV, at least 8 MeV, at least 10 MeV, at most 20 MeV, at most 18 MeV, at most 16 MeV, at most 14 MeV, at most 12 MeV, at most 10 MeV, at most 8 MeV, at most 6 MeV, at most 4 MeV, at most 2 MeV, and/or at most 1 MeV.

The electron beam irradiation system may include a focus lens, such as focus lens 128 of FIG. 2. An example of the focus lens includes a focus coil configured to generate an electric field and/or a magnetic field that interacts with and/or focuses the electron beam. The focus lens may be configured to focus the electron beam, such as on the granular polymeric material, and the irradiating may include focusing the electron beam on the granular polymeric material with, via, and/or utilizing the focus lens.

The electron beam irradiation system may include a vacuum chamber, such as vacuum chamber 130 of FIG. 2. When the electron beam irradiation system includes the vacuum chamber, the positioning at 320 may include positioning the granular polymeric material within the vacuum chamber, such as within granule holder 115 that may be positioned within the vacuum chamber. Also when the electron beam radiation system includes the vacuum chamber, and prior to the crosslinking at 330, methods 300 also may include evacuating the vacuum chamber. The evacuating may include evacuating with, via, and/or utilizing a vacuum pump, such as vacuum pump 132 of FIG. 2.

Examples of the vacuum pump include a gas transfer pump, a kinetic transfer pump, a positive displacement pump, and/or an entrapment pump.

Methods 300 also may include agitating the granular polymeric material during the irradiating. As an example, the electron beam irradiation system may include an agitation apparatus, such as agitation apparatus 140 of FIG. 2. Examples of the agitation apparatus include a rotating blade, a rotating screen, and/or a vibratory agitation apparatus. When the electron beam irradiation system includes the agitation apparatus, the agitating may include agitating with, via, and/or utilizing the agitation apparatus. The agitating may increase and/or improve the crosslinking at 330. As an example, the agitating may increase a potential for complete exposure of the granular polymeric material to the electron beam, may increase a potential for exposure of all sides of the granular polymeric material to the electron beam, may increase an overall degree of crosslinking of the granular polymeric material, and/or may provide deeper penetration, on average, of the electron beam into individual granules of the granular polymeric material.

In some examples, the irradiating may include sequentially irradiating the granular polymeric material utilizing a plurality of irradiation steps. In these examples, the agitating may include agitating the granular polymeric material between at least two irradiation steps and/or even between each sequential pair of irradiation steps.

In some examples, and as illustrated in solid lines in FIG. 2, electron beam irradiation system 110 may include a single electron beam source 120. In such examples, the sequentially irradiating may include turning the single electron beam source 120 on and off a plurality of times, such as to permit the agitating to be performed between the irradiation steps and/or to permit granular polymeric material 190 and/or crosslinked polymer granules 198 to cool between successive irradiation steps.

In some examples, and as illustrated in solid and in dashed lines in FIG. 2, electron beam irradiation system 110 may include a plurality of electron beam sources 120 that may be configured to concurrently and/or sequentially irradiate granular polymeric material 190 and/or crosslinked polymer granules 198. As an example, and as illustrated on the left side of FIG. 2, a first electron beam source 120 may irradiate granular polymeric material 190 and/or crosslinked polymer granules 198 from a top side thereof, and a second electron beam source 120 may irradiate granular polymeric material 190 and/or crosslinked polymer granules 198 from a bottom side thereof.

As another example, electron beam irradiation system 110 may include a conveyance apparatus 178. Conveyance apparatus 178, when present, may be configured to operatively translate granule holder 115 such that electron beams 124 from different electron beam sources 120 may irradiate granular polymeric material 190 and/or crosslinked polymer granules 198 during different time periods. In these examples, the sequentially irradiating may be performed by electron beams generated by different electron beam sources.

Methods 300 may include cooling the granular polymeric material during the irradiating. When the irradiating includes irradiating via the plurality of irradiation steps, the cooling may include passively cooling the granular polymeric material between successive irradiation steps. Additionally or alternatively, the cooling also may include actively cooling the granular polymeric material. The actively cooling may be performed during the irradiating, subsequent to the irradiating, during the plurality of irradiation steps, and/or between successive irradiation steps. As an example, the cooling may include contacting the granular polymeric material with a cooling fluid stream, such as cooling fluid stream 176 of FIG. 2, which may be provided by a cooling fluid source, such as cooling fluid source 174 of FIG. 2.

It is within the scope of the present disclosure that the irradiating, when performed, may include irradiating with any suitable beam dosage. As an example, the beam dosage may be selected to generate at least one desired mechanical property in the crosslinked polymer granules, examples of which are disclosed herein. As more specific examples, the beam dosage may include beam dosages of at least 1 megarads (Mrad), at least 5 Mrad, at least 10 Mrad, at least 15 Mrad, at least 20 Mrad, at least 30 Mrad, at least 40 Mrad, at least 60 Mrad, at least 80 Mrad, at least 100 Mrad, at least 150 Mrad, at least 200 Mrad, at least 300 Mrad, at least 400 Mrad, at least 500 Mrad, at least 750 Mrad, at least $10^3$ Mrad, at least $10^4$ Mrad, at least $10^5$ Mrad, at most $10^6$ Mrad, at most $10^5$ Mrad, at most $10^4$ Mrad, at most $10^3$ Mrad, at most 750 Mrad, at most 500 Mrad, at most 400 Mrad, at most 300 Mrad, at most 250 Mrad, at most 200 Mrad, at most 150 Mrad, and/or at most 100 Mrad.

Another example of the crosslinking apparatus includes an extrusion apparatus. FIG. 3 is a schematic illustration of examples of a crosslinking apparatus 106 in the form of an extrusion apparatus 160 that may be utilized during manufacture of highly crosslinked polymer particulate, according to the present disclosure.

In some examples, the crosslinking at 330 may include combining the granular polymeric material with a crosslinking agent to form a material-agent mixture. In these examples, the crosslinking at 330 further may include extruding the material-agent mixture with the extrusion apparatus to at least partially form the plurality of crosslinked polymer granules.

The combining may include combining any suitable granular polymeric material, examples of which are disclosed herein, with any suitable crosslinking agent. Examples of the crosslinking agent include a peroxide, an organic peroxide, di-(2,4-dichlorobenzoyl) peroxide, tert-butyl peroxybenzoate, 1,1-di-(tert-butylperoxy)-3,3,5-trimethylcyclohexane, dicumyl peroxide, tert-butyl cumyl peroxide, di-tert-butyl peroxide, 2,5-dimethyl-2,5-di(tert-butylperoxy)hexyne-3, 2,5-di(2-tert-butyl peroxyisopropyl)-benzene, 2,5-dimethyl-2,5-di(tert-butylperoxy)hexane, a silane, and/or an azo compound.

The combining may include combining the granular polymeric material and the crosslinking agent in any suitable relative proportion. As examples, the combining may include combining such that the material-agent mixture includes at least 0.1 weight percent (wt %) of the crosslinking agent, at least 0.25 wt % of the crosslinking agent, at least 0.5 wt % of the crosslinking agent, at least 1 wt % of the crosslinking agent, at least 2 wt % of the crosslinking agent, at least 3 wt % of the crosslinking agent, at least 4 wt % of the crosslinking agent, at least 5 wt % of the crosslinking agent, at most 10 wt % of the crosslinking agent, at most 8 wt % of the crosslinking agent, at most 6 wt % of the crosslinking agent, at most 4 wt % of the crosslinking agent, at most 2 wt % of the crosslinking agent, and/or at most 1 wt % of the crosslinking agent.

As illustrated in FIG. 3, the combining may include combining a granular polymeric material 190 and a crosslinking agent 192 within a mixer 150 to produce and/or generate a material-agent mixture 193. The material-agent mixture then may be provided to extrusion apparatus 160, and/or to a hopper 162 of the extrusion apparatus, before being extruded, by the extrusion apparatus, to produce and/or generate a plurality of crosslinked polymer granules 198 and/or an extruded highly crosslinked polymeric material 196 that may be utilized to define the plurality of crosslinked polymer granules.

The extruding may include heating the material-agent mixture to generate a heated material-agent mixture and subsequently cooling the heated material-agent mixture to at least partially form the plurality of crosslinked polymer granules. As illustrated in FIG. 3, the extruding may include flowing material-agent mixture 193 through a pressure-generating apparatus 164, such as a screw extruder, that may be configured to apply a mechanical force and/or a pressure to the material-agent mixture. The heating may include heating with, via, and/or utilizing a heater 166 to produce and/or generate a heated material-agent mixture 194. A combination of the heat, pressure generated within the pressure-generating apparatus, and contact between the granular polymeric material and the crosslinking agent may cause the granular polymeric material to crosslink, within the extrusion apparatus, to form the extruded highly crosslinked polymeric material and/or to at least partially define the crosslinked polymer granules. The heating may include heating to any suitable temperature. As examples, the heating may include heating the material-agent mixture without melting the granular polymeric material and/or heating to a temperature of at least 10 degrees Celsius (° C.), at least 12° C., at least 14° C., at least 16° C., at least 18° C., at most 30° C., at most 28° C., at most 26° C., at most 24° C., at most 22° C., and/or at most 20° C.

In some examples, the extruding may include extruding such that the extrusion structure forms, or directly forms, the plurality of crosslinked polymer granules. In other examples, the extruding may include extruding to form the extruded highly crosslinked polymeric material, which may be larger than a desired size, or maximum extent, of the plurality of crosslinked polymer granules. In these examples, the forming at 340 further may include severing the extruded highly crosslinked polymeric material to form the plurality of crosslinked polymer granules. Examples of the severing include cutting, grinding, chopping, breaking, slicing, splitting, and/or otherwise decreasing a size, or a maximum dimension, of the extruded highly crosslinked polymeric material to produce and/or generate the crosslinked polymer granules.

As illustrated in FIG. 3, the extrusion structure may include an extrusion die 168 that may define at least one aperture, and the extruded highly crosslinked polymeric material may be produced from the aperture. As also illustrated in FIG. 3, extruded highly crosslinked polymeric material 196 may be provided to a severing apparatus 170, which may sever the extruded highly crosslinked polymeric material to produce and/or generate the plurality of crosslinked polymer granules 198. Examples of severing apparatus 170 include a cutter, a grinder, a chopper, a splitter, and/or a slicer.

In the examples illustrated in FIGS. 2-3, crosslinking apparatus 106 has been illustrated and described as either electron beam irradiation system 110 or extrusion apparatus 160. However, it is within the scope of the present disclosure that other crosslinking apparatus may be utilized to perform methods 300. Additionally or alternatively, it is also within the scope of the present disclosure that extrusion apparatus 160 and electron beam irradiation system 110 may be utilized in series. As an example, and as discussed herein, extrusion apparatus 160 may be utilized to produce and/or generate crosslinked polymer granules 198. Subsequently, electron beam irradiation system 110 may be utilized to irradiate the crosslinked polymer granules to cause additional crosslinking within the crosslinked polymer granules and/or to increase the degree of crosslinking of the crosslinked polymer granules.

As used herein, the phrase "highly crosslinked" may be utilized to modify and/or to describe polymeric material, polymer granules that are at least partially formed from the polymeric material, and/or polymer particulate that includes the polymer granules. Such polymeric material, polymer granules, and/or polymer particulate, when "highly crosslinked," include polyethylene polymer chains with a degree of crosslinking sufficient to provide the highly crosslinked polymeric material, the highly crosslinked polymer granules, and/or the highly crosslinked polymer particulate with one or more of the below-described properties. Stated another way, a degree of crosslinking needed to provide the polymeric material, the polymer granules, and/or the polymer particulate with one or more of the below-described properties indicates that the polymeric material is a highly crosslinked polymeric material, that the polymer granules are highly crosslinked polymer granules, and/or the polymer particulate is a highly crosslinked polymer particulate in the context of the instant disclosure.

As an example, and upon fluid contact with naturally occurring liquid hydrocarbons, such as crude oil, within a hydrocarbon well, the highly crosslinked polymer particulate disclosed herein may undergo less than a threshold increase in mass due to absorption of the naturally occurring liquid hydrocarbons. Examples of the threshold increase in mass include threshold increases of 0.05%, 0.1%, 0.25%, 0.5%, 0.75%, 1%, 2%, 3%, 4%, and/or 5%.

As another example, and upon fluid contact with crude oil for a time period of 8 weeks, at a temperature of 85 degrees Celsius, and under a uniaxial stress of 35 Megapascals, the highly crosslinked polymer particulate disclosed herein undergoes at most a threshold increase in strain.

Examples of the threshold increase in strain include increases of 1%, 2%, 3%, 4%, 5%, 6%, 8%, and/or 10%.

As yet another example, and when subjected to a confining stress of 42 Megapascals at a temperature of 85 degrees Celsius, a monolayer of the highly crosslinked polymer particulate disclosed herein defines at least a threshold fluid conductivity. Examples of the threshold fluid conductivity include fluid conductivities of $0.5 \times 10^4$ micrometers$^3$, $1 \times 10^4$ micrometers$^3$, $1.5 \times 10^4$ micrometers$^3$, $1.75 \times 10^4$ micrometers$^3$, $2 \times 10^4$ micrometers$^3$, $2.25 \times 10^4$ micrometers$^3$, $2.75 \times 10^4$ micrometers$^3$, $3 \times 10^4$ micrometers$^3$, $3.5 \times 10^4$ micrometers$^3$, $4 \times 10^4$ micrometers$^3$, $4.5 \times 10^4$ micrometers$^3$, $5 \times 10^4$ micrometers$^3$, and/or $6 \times 10^4$ micrometers$^3$.

As another example, the highly crosslinked polymer particulate disclosed herein may have at least a threshold onset of melting temperature. Examples of the threshold onset of melting temperature include temperatures of 40 degrees Celsius, 45 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, and/or 110 degrees Celsius.

As yet another example, the highly crosslinked polymer particulate disclosed herein may have at least a threshold melting temperature. Examples of the threshold melting temperature include temperatures of 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, 110 degrees Celsius, 115 degrees Celsius, 120 degrees Celsius, 125 degrees Celsius, 130 degrees Celsius, and/or 135 degrees Celsius.

As another example, the highly crosslinked polymer particulate disclosed herein may exhibit less than a threshold strain when subject to a stress of 35 Megapascals at a temperature of 85 degrees Celsius. Examples of the threshold strain include threshold strains of 40%, 39%, 38%, 37%, 36%, 35%, 34%, 33%, 32%, 31%, and/or 30%.

As yet another example, and when compared to an analogous uncrosslinked polymer particulate, the highly crosslinked polymer particulate disclosed herein may exhibit at least a threshold decrease in strain when subject to a stress of 35 Megapascals at a temperature of 85 degrees Celsius. Examples of the threshold decrease in strain include decreases of 10%, 9%, 8%, 7%, 6%, 5%, 4%, 3%, and/or 2%.

As used herein, the phrase "analogous uncrosslinked polymer particulate," when utilized to compare to the highly crosslinked polymer particulate disclosed herein, may include an uncrosslinked polymer particulate that has and/or defines an identical chemical structure to that of the highly crosslinked polymer particulate with the exception that the uncrosslinked polymer particulate does not include the plurality of chemical crosslinks. Stated another way, a granular polymeric material may be crosslinked to form and/or define the highly crosslinked polymer particulate, and the analogous uncrosslinked polymer particulate may refer to the granular polymeric material prior to being crosslinked to form the highly crosslinked polymer particulate.

The highly crosslinked polymeric material, the highly crosslinked polymer granules, and/or the highly crosslinked polymer particulate disclosed herein may, in addition to one or more of the above-described properties, also, or optionally also, exhibit one or more of the below-described properties. As an example, the highly crosslinked polymer particulate may define a particulate density. Examples of the particulate density include densities of at least 0.8 grams per cubic centimeter (g/cc), at least 0.82 g/cc, at least 0.84 g/cc, at least 0.86 g/cc, at least 0.88 g/cc, at least 0.9 g/cc, at least 0.92 g/cc, at least 0.94 g/cc, at least 0.96 g/cc, at least 0.98 g/cc, at least 1 g/cc, at most 2.6 g/cc, at most 2.4 g/cc, at most 2.2 g/cc, at most 2 g/cc, at most 1.8 g/cc, at most 1.6 g/cc, at most 1.4 g/cc, at most 1.2 g/cc, at most 1.1 g/cc, at most 1 g/cc, at most 0.99 g/cc, at most 0.98 g/cc, at most 0.97 g/cc, and/or at most 0.96 g/cc.

As another example, and when compared to the analogous uncrosslinked polymer particulate, the highly crosslinked polymer particulate may resist fusing of the plurality of crosslinked polymer granules when exposed to a compressive force. Stated another way, fusing of the highly crosslinked polymer particulate may be quantitatively less than fusing of the analogous uncrosslinked polymer particulate. As examples, fusing of the highly crosslinked polymer particulate may be at least 10% less, at least 20% less, at least 30% less, at least 40% less, at least 50% less, at least 60% less, at least 70% less, at least 80% less, and/or at least 90% less than fusing of the analogous uncrosslinked polymer particulate when exposed to the compressive force.

As yet another example, and when compared to the analogous uncrosslinked polymer particulate, the highly crosslinked polymer particulate may resist flowing of the plurality of crosslinked polymer granules when exposed to the compressive force. Stated another way, the flow of the highly crosslinked polymer particulate may be quantitatively less than the flow of the analogous uncrosslinked polymer particulate. As examples, flow of the highly crosslinked polymer particulate may be at least 10% less, at least 20% less, at least 30% less, at least 40% less, at least 50% less, at least 60% less, at least 70% less, at least 80% less, and/or at least 90% less than the flow of the analogous uncrosslinked polymer particulate when exposed to the compressive force.

As another example, and when compared to the analogous uncrosslinked polymer particulate, the highly crosslinked polymer particulate may maintain fluid permeability among and/or between the plurality of crosslinked polymer granules when exposed to the compressive force. Stated another way, the fluid permeability of the highly crosslinked polymer particulate may decrease to a lesser extent when compared to fluid permeability of the analogous uncrosslinked polymer particulate. As examples, fluid permeability of the highly crosslinked polymer particulate may decrease at least 10% less, at least 20% less, at least 30% less, at least 40% less, at least 50% less, at least 60% less, at least 70% less, at least 80% less, and/or at least 90% less than the fluid permeability of the analogous uncrosslinked polymer particulate when exposed to the compressive force.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A);

in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to industries that utilize polyethylene.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of manufacturing a crosslinked polymer particulate, the method comprising:
   positioning a granular polymeric material within a crosslinking apparatus, wherein the granular polymeric material includes a plurality of polyethylene polymer chains;
   crosslinking the granular polymeric material with the crosslinking apparatus to form a crosslinked polymeric material that includes a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains; and
   forming a plurality of crosslinked polymer granules from the crosslinked polymeric material, wherein a characteristic dimension of each crosslinked polymer granule of the plurality of crosslinked polymer granules is at least 10 micrometers and at most 5 millimeters, and wherein the crosslinked polymeric material has a particulate density of 1 g/cc to 2.6 g/cc.

2. The method of claim 1, wherein the forming the plurality of crosslinked polymer granules is at least one of:
   (i) at least partially concurrent with the crosslinking;
   (ii) responsive to the crosslinking; and
   (iii) subsequent to the crosslinking.

3. The method of claim 1, wherein the crosslinking includes at least one of:
   (i) directly crosslinking the granular polymeric material; and (ii) maintaining a morphology of the granular polymeric material in the plurality of crosslinked polymer granules.

4. The method of claim 1, wherein the forming the plurality of crosslinked polymer granules includes at least one of:
(i) changing a morphology of the granular polymeric material to form the plurality of crosslinked polymer granules; and
(ii) combining a plurality of polymeric granules of the granular polymeric material to form the crosslinked polymeric material.

5. The method of claim 1, wherein the forming the plurality of crosslinked polymer granules includes severing the crosslinked polymeric material to form the plurality of crosslinked polymer granules.

6. The method of claim 1, wherein the crosslinking includes irradiating the granular polymeric material with an electron beam to facilitate the forming the plurality of crosslinked polymer granules.

7. The method of claim 6, wherein the crosslinking apparatus includes an electron beam source configured to generate the electron beam, and further wherein the irradiating includes irradiating via the electron beam source.

8. The method of claim 7, wherein the electron beam source includes a filament configured to emit the electron beam, wherein the irradiating includes applying an acceleration voltage to the filament to generate the electron beam, and further wherein at least one of:
(i) the acceleration voltage is at least 200 kilo-electron volts;
(ii) the acceleration voltage is selected to generate at least one desired mechanical property in the crosslinked polymer granules; and
(iii) the acceleration voltage is selected such that the electron beam fully penetrates the granular polymeric material.

9. The method of claim 7, wherein the crosslinking apparatus includes a vacuum chamber, wherein the positioning includes positioning the granular polymeric material within the vacuum chamber, and further wherein, prior to the crosslinking, the method includes evacuating the vacuum chamber.

10. The method of claim 7, wherein the method further includes agitating the granular polymeric material during the irradiating.

11. The method of claim 7, wherein the irradiating includes sequentially irradiating the granular polymeric material with a plurality of irradiation steps.

12. The method of claim 11, wherein the method includes agitating the granular polymeric material between at least two irradiation steps of the plurality of irradiation steps.

13. The method of claim 7, wherein the method further includes cooling the granular polymeric material during the irradiating.

14. The method of claim 7, wherein the irradiating includes at least one of:
(i) irradiating with a beam dosage of at least 20 megarads;
(ii) irradiating with a beam dosage of at most $10^6$ megarads; and
(iii) irradiating with a beam dosage selected to generate at least one desired mechanical property in the crosslinked polymer granules.

15. The method of claim 1, wherein the crosslinking includes:
(i) combining the granular polymeric material with a crosslinking agent to form a material-agent mixture; and
(ii) extruding the material-agent mixture with an extrusion apparatus to at least partially form the plurality of crosslinked polymer granules.

16. The method of claim 15, wherein the extruding includes extruding to form an extruded crosslinked polymeric material, and further wherein the forming the plurality of crosslinked polymer granules includes severing the extruded crosslinked polymeric material to form the plurality of crosslinked polymer granules.

17. The method of claim 15, wherein the crosslinking agent includes at least one of:
(i) a peroxide;
(ii) an organic peroxide;
(iii) di-(2,4-dichlorobenzoyl) peroxide;
(iv) tert-butyl peroxybenzoate;
(v) 1,1-di-(tert-butylperoxy)-3,3,5-trimethylecyclohexane;
(vi) dicumyl peroxide;
(vii) tert-butyl cumyl peroxide;
(viii) di-tert-butyl peroxide;
(ix) 2,5-dimethyl-2,5-di(tert-butylperoxy)hexyne-3;
(x) 2,5-di(2-tert-butyl peroxyisopropyl)-benzene;
(xi) 2,5-dimethyl-2,5-di(tert-butylperoxy)hexane;
(xii) a silane; and
(xiii) an azo compound.

18. The method of claim 15, wherein the combining includes combining such that the material-agent mixture includes at least 0.5 weight percent of the crosslinking agent.

19. The method of claim 1, wherein the granular polymeric material includes polyethylene pellets generated within a polyethylene reactor.

20. The method of claim 19, wherein the method further includes generating the polyethylene pellets within the polyethylene reactor, and further wherein the generating includes selecting at least one property of a catalyst, utilized within the polyethylene reactor, such that a characteristic dimension of the granular polymeric material is at least 10 micrometers and at most 5 millimeters.

* * * * *